Aug. 19, 1969   F. BOUDREAU   3,461,600
TRAP-CHAIN LOCK RING
Filed Feb. 26, 1968
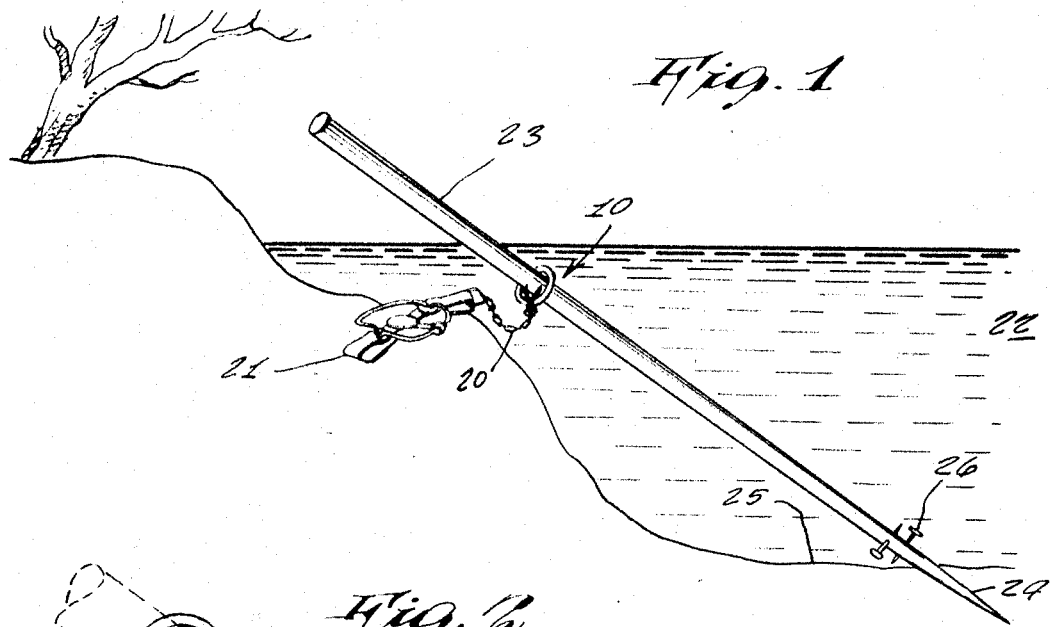
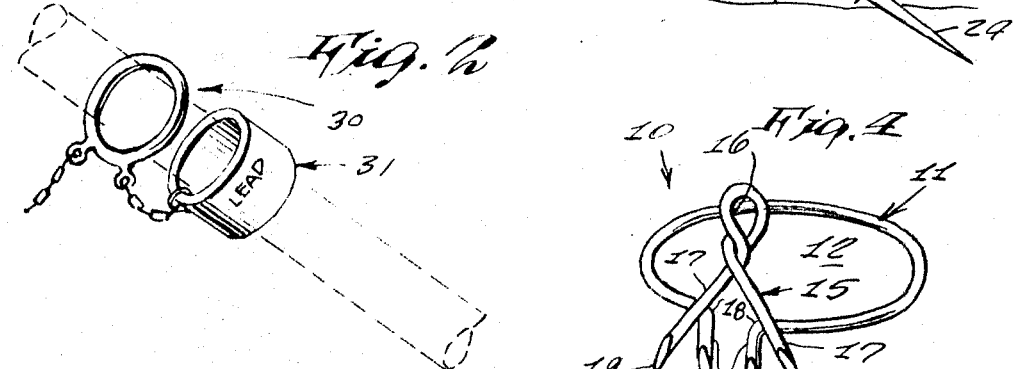
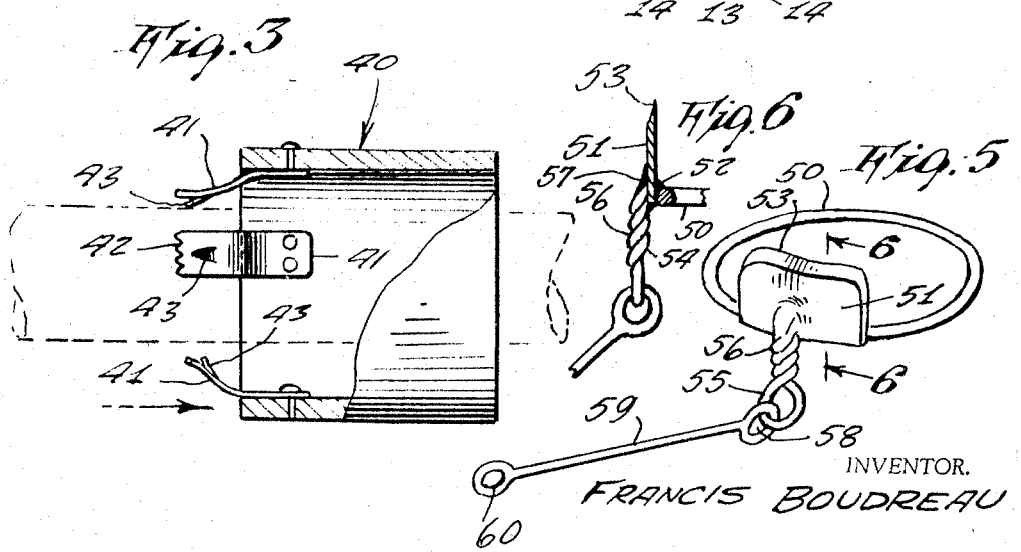
INVENTOR.
FRANCIS BOUDREAU

United States Patent Office 3,461,600
Patented Aug. 19, 1969

3,461,600
TRAP-CHAIN LOCK RING
Francis Boudreau, 144–B Spruce St. N.,
Timmins, Ontario, Canada
Filed Feb. 26, 1968, Ser. No. 708,200
Int. Cl. A01m 23/26
U.S. Cl. 43—96     3 Claims

ABSTRACT OF THE DISCLOSURE

An attachment for an animal trap including a ring that is secured to the trap chain, the ring being radialy slidable downwardly along a pole imbedded at its lower end within a body of water. The ring in one form has a weighted portion while other forms have pointed projections which makes it difficult to slide upwardly. An animal caught in the trap will upon struggle descend to the bottom of the water and be not able to ascend again, thus drowning.

This invention relates generally to animal traps. More specifically it relates to animal trap accessories.

A principal object of the present invention is to provide a more humane animal trap that will quickly kill the animal instead of allowing it to suffer by remaining alive while it is caught in a trap.

Another object is to provide an improved animal trap which will preserve the animal pelt in a better condition than would otherwise be possible; it being known that trapped animals have chewed off a trapped leg, or that other animals have taken the captured game.

Yet another object is to provide an improved animal trap accessory that is readily securable to various existing traps such as are used for catching beaver, muskrat and other animals that habitat around ponds, and other bodies of water.

Yet a further object is to provide an improved trap which includes the use of a pole such as can be readily found in wooded areas in the vicinity of where the trap is set thereby eliminating the necessity of transporting factory produced poles to the trapping site.

Other objects are to provide an improved animal trap which is simple in design, inexpensive to manufacture, rugged in construction, easy to use and efficient in operation.

These and other objects will be readily evident upon a study of the following specification and the accompanying drawing wherein:

FIGURE 1 is a perspective view of the present invention shown in operative use,

FIGURE 2 is a perspective view of a modified form of the invention,

FIGURE 3 is a side view, partly in cross section of yet another modified form thereof, FIGURE 4 is a perspective view of the invention utilized in the structure illustrated in FIGURE 1, FIGURE 5 is a similar view of a modified design thereof, and FIGURE 6 is a cross sectional view taken on line 6—6 of FIGURE 5.

Referring now to the drawing in detail, the reference numeral 10 represents a new ring device according to the present invention wherein, as illustrated in FIGURES 1 and 4, there is a metal ring 11 formed of heavy wire, the ring forming a central loop 12. The wire ends 13 are bent, at right angles in the same direction and extend parallel to a central axis of the ring. The wire ends are sharpened to form pointed tips 14. A wire element 15 is centrally twisted to form an intermediate lop 16 between opposite diagonal ends 17 which are then welded across the bends 18 of ring 11, the ends 17 having likewise pointed lips 19 that project generally in the same direction as the pointed tips 14.

In operative use, a chain 20 of a trap 21 is secured to the lop 16. The trap 21 is placed in the vicinity of a water's edge of a pond or other body of water 22 where animals habitat, the traps being placed below the water surface. A pole 23 is inserted through the loop 12, the lower end of the pole being sharpened as shown at 24 so that it can be driven at an angle into the pond bottom 25. Nails 26 are secured near the pointed end of the pole, or branches may be left intact therewith. When an animal gets caught in the trap, it dives in the pond to escape, causing the ring (with its pointed tips extending toward the upper end of the pole) to slide downwardly along the pole and thus drag the animal to the pond botom. The pointed tips prevent the ring from sliding upwardly should the animal try to swim upward. After the animal is thus drowned, the trapper need only to pull the pole out of the water. The nails 26 will prevent the ring from sliding off the pole.

In a modified construction, shown in FIGURE 2, a ring 30 includes a separate ring of lead 31 secured by a chain to the ring 30, the lead ring being also slidable on the pole, and providing weight means to prevent the struggling animal from rising to the pond surface for air.

In FIGURE 3, a further modified construction comprises a sleeve configurated ring 40 having leaf springs 41 secured thereto and extending toward one direction, each leaf spring having a toothed edge 42 and projection 43 for engaging the pole so to permit downward travel therealong but prevent reverse upward travel.

A still further modified form of the invention illustrated in FIGURES 5 and 6 is shown to comprise a ring 50 having an arcuate plate 51 secured along one edge to one side thereof by a weld 52, the plate extending parallel to the axis of the ring, and having an opposite edge sharpened to form a blade edge 53. A wire 54 is twisted to form a central loop 55 between opposite twisted ends 56 which are secured by a weld 57 to the other side of plate 51. A loop 58 at one end of a rod 59 is secured to the loop 55. A loop 60 at the opposite end of rod 59 provides means for securement to end of trap chain 20.

While various changes may be made in the detail construction, it is understood that such changes will be within the spirit and scope of the present invention.

Having described my invention, what I claim as new and desire to secure by Letters Patent is:

1. A lock ring device for trapping and drowning animals, comprising in combination, a ring for receiving a pole, said ring having a loop for securement to a trap chain, said ring having opposing spaced ends turned at right angles to the plane of the ring, said ends having pointed tips, said loop having twisted ends extending diagonally across the ring, said loop ends being secured to the ring adjacent the right angle bends of the ring ends, wherein the loop ends have pointed tips extending in the same direction as the ring tips.

2. A lock ring device for trapping animals comprising a ring for receiving a pole, said ring having a loop for securement to a trap chain and a second ring of predetermined weight for mounting on said pole and attached to the first said ring whereby said second ring is of sufficient weight to prevent upward movement of the first said ring on said pole due to the escaping efforts of the animals trapped.

3. A lock ring device for trapping animals comprising a sleeve for receiving a pole and adapted to be secured to trap chain, said sleeve having leaf springs at one end extended therefrom and biased radially inward against said pole, said springs having toothed edges and projections to arrest sliding in one direction on said pole.

References Cited

UNITED STATES PATENTS

| | | | |
|---|---|---|---|
| 1,634,177 | 6/1927 | Dart et al. | 43—96 |
| 1,771,443 | 7/1930 | McCrea | 43—96 |

WARNER H. CAMP, Primary Examiner